United States Patent
Hwang et al.

(10) Patent No.: US 8,693,306 B2
(45) Date of Patent: Apr. 8, 2014

(54) APPARATUS AND METHOD FOR TRANSMITTING DATA IN LOW-FREQUENCY BAND IN HUMAN BODY COMMUNICATION SYSTEM, AND THE HUMAN BODY COMMUNICATION SYSTEM

(75) Inventors: Sang-Yun Hwang, Suwon-si (KR); Chul-Jin Kim, Yongin-si (KR); Jahng-Sun Park, Suwon-si (KR); Jong-Rim Lee, Yongin-si (KR); Hyun-Kuk Choi, Suwon-si (KR); Chang-Ryong Heo, Seoul (KR); Seong-Jun Song, Seoul (KR)

(73) Assignee: Samsung Electronics Co., Ltd. (KR)

( * ) Notice: Subject to any disclaimer, the term of this patent is extended or adjusted under 35 U.S.C. 154(b) by 137 days.

(21) Appl. No.: 13/395,356

(22) PCT Filed: May 7, 2010

(86) PCT No.: PCT/KR2010/002935
§ 371 (c)(1),
(2), (4) Date: Mar. 9, 2012

(87) PCT Pub. No.: WO2011/138991
PCT Pub. Date: Nov. 10, 2011

(65) Prior Publication Data
US 2012/0170482 A1 Jul. 5, 2012

(51) Int. Cl.
*H04J 9/00* (2006.01)
*H04J 11/00* (2006.01)
*H04W 4/00* (2009.01)
*H04B 5/00* (2006.01)

(52) U.S. Cl.
USPC ........... 370/204; 370/208; 370/330; 370/338; 455/41.1

(58) Field of Classification Search
USPC .............. 370/203–210, 310–350; 455/39–48, 455/422.1–431, 500
See application file for complete search history.

(56) References Cited

U.S. PATENT DOCUMENTS 7,171,177 B2 * 1/2007 Park et al. .................. 455/188.1
7,650,113 B2 * 1/2010 Song et al. ................... 455/41.2
(Continued)

FOREIGN PATENT DOCUMENTS

JP 2006-303736 11/2006
JP 2010-510709 4/2010
(Continued)

OTHER PUBLICATIONS

PCT/ISA/237 Written Opinion issued on PCT/KR2010/002935 (pp. 4).

(Continued)

*Primary Examiner* — Tri H Phan
(74) *Attorney, Agent, or Firm* — The Farrell Law Firm P.C.

(57) ABSTRACT

The present invention proposes a method for transmitting data considering a non-contact state of a human body, while selecting a central frequency in various ranges in the human body communication system. To this end, a first embodiment of the present invention proposes a human body communication system in which a central frequency can be simply moved, and specifically, proposes a data transmission apparatus comprising a frequency shifter which shifts the output of a multiplexer into a specified frequency so as to enable the central frequency to be moved. In addition, a second embodiment of the present invention proposes a human body communication system which controls not only central frequency selection and transmission band minimization, but also a data rate, modulation, etc, and thus can perform stable communication in a non-contact state of a human body. Through this, it is possible to maximize the band efficiency, and to transmit data considering a non-contact state of a human body.

19 Claims, 7 Drawing Sheets

(56) References Cited

U.S. PATENT DOCUMENTS

| | | |
|---|---|---|
| 7,664,476 B2 | 2/2010 | Yanagida |
| 7,684,769 B2 * | 3/2010 | Song et al. .................. 455/100 |
| 8,160,672 B2 * | 4/2012 | Kim et al. .................. 600/380 |
| 8,224,244 B2 * | 7/2012 | Kim et al. .................. 455/41.1 |
| 8,340,158 B2 | 12/2012 | Lim et al. |
| 8,351,402 B2 | 1/2013 | Lim et al. |
| 2006/0252371 A1 | 11/2006 | Yanagida |
| 2007/0190940 A1 | 8/2007 | Lee et al. |
| 2010/0103918 A1 * | 4/2010 | Song et al. .................. 370/343 |

FOREIGN PATENT DOCUMENTS

| | | |
|---|---|---|
| JP | 2010-512094 | 4/2010 |
| KR | 100522132 | 10/2005 |
| KR | 100793145 | 1/2008 |
| KR | 100835175 | 6/2008 |
| KR | 100878719 | 1/2009 |
| WO | WO 2006/138623 | 12/2006 |

OTHER PUBLICATIONS

PCT/ISA/210 Search Report issued on PCT/KR2010/002935 (pp. 3).

* cited by examiner

APPARATUS AND METHOD FOR TRANSMITTING DATA IN LOW-FREQUENCY BAND IN HUMAN BODY COMMUNICATION SYSTEM, AND THE HUMAN BODY COMMUNICATION SYSTEM

TECHNICAL FIELD

The present invention relates to an apparatus and method for transmitting data in a low-frequency band, and more particularly to an apparatus and method for transmitting data in a low-frequency band in a human body communication system, and the human body communication system.

BACKGROUND ART

An electric field communication refers to a communication having a communication scheme in which a transmitter induces an electric field and forms the electric field in a dielectric material and a receiver then detects the electric field, so as to enable transmission and reception of data. Among such an electric field communication, especially a communication employing a human body as a dielectric material is called a human body communication.

In general, the human body communication has high noise in a band of several MHz due to user interference, etc., and has noise distributed over bands of several scores of MHz. FIG. 1 shows the frequency characteristics of human body communication channels as described above. In the human body communication scheme as described above, the transmission efficiency is maximized by applying a modulation scheme suitable for characteristics of a channel for communication. Therefore, in the human body communication, transmitted data should be carried by carriers of a band capable of avoiding the band of several scores of MHz in which human noise is concentrated. However, in the human body communication, when the carriers are too high, elements radiated from a human body increase. Therefore, the frequency band of a signal transmitted through a human body usually has a band within several scores of MHz, in consideration of the increase of the radiated elements and the noise characteristics.

Further, in the human body communication, it is also important to maximize the efficiency of the transmission band, because it is usual that the human noise has an energy level higher than that of temperature noise. Therefore, the central frequency $f_0$ should be located within scores of MHz as shown in FIG. 1, and a transmission with a maximum band efficiency is an important object to be achieved in the human body communication.

Meanwhile, in the human body communication, data transmission is possible through an electric field formed around a human body using the dielectric characteristic of the human body and is performed after an intuitive selection of a terminal by a user. Therefore, the human body communication can provide users with intuitive convenience. In order to maximize the intuitive convenience of a user in data transmission, it is necessary to transmit all data within a short time during which a human body makes a non-contact or proximity contact with an information terminal device, which requires the performance of high speed transmission. In the case of non-contact performance as described above, as the distance from a user's body increases, the magnitude of the electric field decreases at a ratio of $1/r^2$, which implies that the magnitude of a received signal rapidly decreases as user's body moves farther away. Accordingly, in order to compensate for signal attenuation due to the human body, the reception sensitivity of communication has been improved by various methods, such as methods using optical sensors, magnetic sensors, etc. or methods using electrodes for improving ground coupling. The limitation in the reception sensitivity as described above is limited to the case of communication through human contact, and makes the signal processing difficult in the case of a low signal level of a receiver. Further, since it is difficult to determine a human body proximity state or non-contact state, or an ultra-proximity state between devices, it is difficult to select a channel and a communication scheme proper for each state. Further, in the case of human body non-contact communication, the determination of whether to perform a communication is not made based on whether there is a human body contact, and only a proximity of a human body itself starts an operation of a communication system. Therefore, these points should be taken into consideration in the design of a human body communication system.

DISCLOSURE

Technical Problem

Due to the characteristics of the human body communication as described above, the human body communication should be implemented in the direction capable of minimizing the power consumption and accomplishing a simple structure in consideration of the power consumption and complexity of a system applied with a kind of connectivity technology. Further, it is necessary to implement a system which enables a communication in consideration of attenuation in a human body non-contact situation. That is, channel environment and system frequency characteristics of the human body communication should be taken into consideration in the design of an apparatus for human body communication.

Technical Solution

Therefore, the present invention provides an apparatus and a method for transmitting data in a low-frequency band in a human body communication system and the human body communication system, which can minimize the transmission band, thereby maximizing the band efficiency.

Also, the present invention provides an apparatus and a method, which can transmit data with a high efficiency while maintaining the reception sensitivity even in a human body non-contact state in a human body communication system, and the human body communication system.

Moreover, the present invention provides an apparatus and a method for data transmission in a low frequency area in a human body communication system and the human body communication system, which can achieve a simple structure and low power consumption.

Advantageous Effects

In an apparatus for data transmission in a low frequency band for human body communication according to the present invention, it is possible to move the central frequency within various ranges in a simple manner, and is possible to minimize the transmission band at the time of low speed data transmission. Further, the present invention implements a system enabling a user to make a communication in a non-contact state by using an electric field around a human body, thereby enabling the selection of a central frequency, the minimization of a transmission band, and the control of data speed and modulation.

BEST MODE

Mode For Invention

Figure 1:
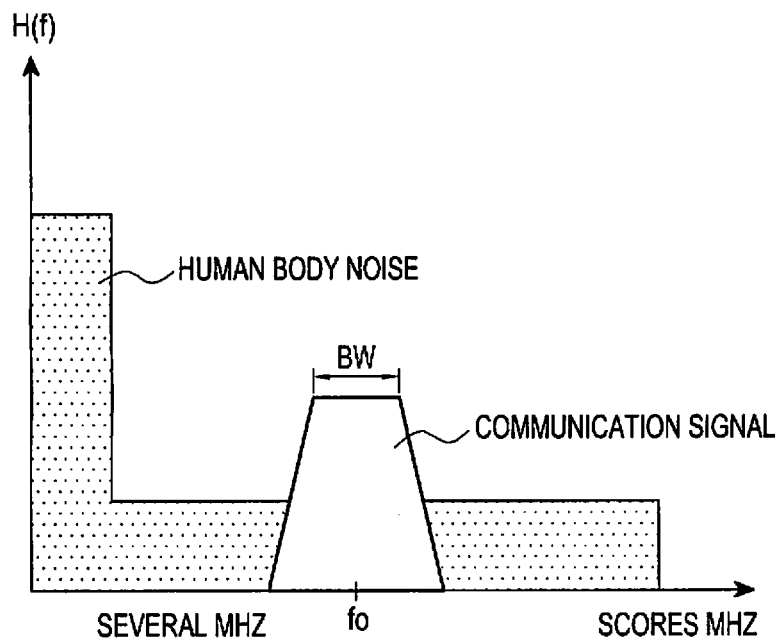
FIG. 1 is a graph showing the frequency characteristics of typical human body communication channels.

In accordance with an aspect of the present invention, there is provided an apparatus for transmitting data in a low frequency band in a human body communication system, the apparatus including: a preamble generator for generating a preamble signal; a header generator for generating packet header information; a data generator for generating data; a serial-to-parallel converter for converting the data transferred from the data generator to symbols through a serial-to-parallel conversion; an orthogonal modulator for mapping the symbols transferred from the serial-to-parallel converter to one of sequences orthogonal to each other; a multiplexer for time-divisionally selecting signals output from the preamble generator, the header generator, and the orthogonal modulator; and a frequency shifter for shifting an output of the multiplexer to a particular frequency.

In accordance with another aspect of the present invention, there is provided a human body communication system for performing a non-contact communication using an electric field around a human body, the human body communication system including: a transmission circuit for transmitting data, which is generated according to a packet format defined by a MAC transmission/reception processor, using a particular frequency; an electrode for outputting an output from the transmission circuit to an outside; an Analog Front End (AFE) circuit for receiving a signal from the electrode, amplifying the signal and removing noise from the signal; a received signal strength measurement unit for measuring a strength of a received signal; a proximity sensor for outputting a proximity sensor value according to detection of a proximity of a human body; a multiplexer for selectively outputting signals from the proximity sensor and the received signal strength measurement unit; a reception circuit for processing signals from the multiplexer and an analog-to-digital converter; and a Micro Controller Unit (MCU) for determining, by using the RSSI value or a proximity sensor value, whether the electrode is in a non-contact state, and outputting a control signal based on a result of the determination.

In accordance with another aspect of the present invention, there is provided a method of transmitting data in a low frequency band in a human body communication system, the method including: generating preamble signals, packet header information, and data; converting the generated data to symbols through a serial-to-parallel conversion; mapping the symbols to one of sequences orthogonal to each other; time-divisionally selecting the preamble signals, the packet header information, and the mapped symbols; and shifting the selected signals, information, and symbols to a particular frequency.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

The present invention proposes a scheme for transmitting data in consideration of a human body non-contact state while selecting a central frequency of various ranges in a human body communication system. To this end, a first embodiment of the present invention proposes a human body communication system capable of moving a central frequency in a simple and easy manner, and particularly proposes a human body communication system, which includes a frequency shifter for shifting an output of a multiplexer to a particular frequency in order to enable the moving of the central frequency. Further, a second embodiment of the present invention proposes a human body communication system, which can achieve a stable communication even in a human body non-contact state through a control of data speed, modulation, etc. as well as minimization of a transmission band and selection of a central frequency. According to the second embodiment of the present invention, it is possible to maximize the band efficiency and to achieve a data transmission in consideration of a human body non-contact state.

Figure 2:
FIG. 2 illustrates a typical packet structure.

Prior to a description of the present invention, a basic construction of a human body communication system will be discussed with reference to FIG. 3, which is a block diagram illustrating a structure of a typical human body communication system. First, a typical packet transmitted through a data transmission apparatus has a typical structure as shown in FIG. 2. In the structure shown in FIG. 2, the preamble is used to notify the start point of the header included in the packet, the header includes packet-related information, such as the length of the packet, and the data includes information to be actually transmitted. In constructing the packet having the structure as described above, only the preamble may be insufficient for finding of an exact start point for restoration of the header and data. Therefore, a proposal of a packet structure, which is stable and simultaneously can minimize the system complexity, further to the typical structure, may enable a more efficient data transmission.

Figure 3:
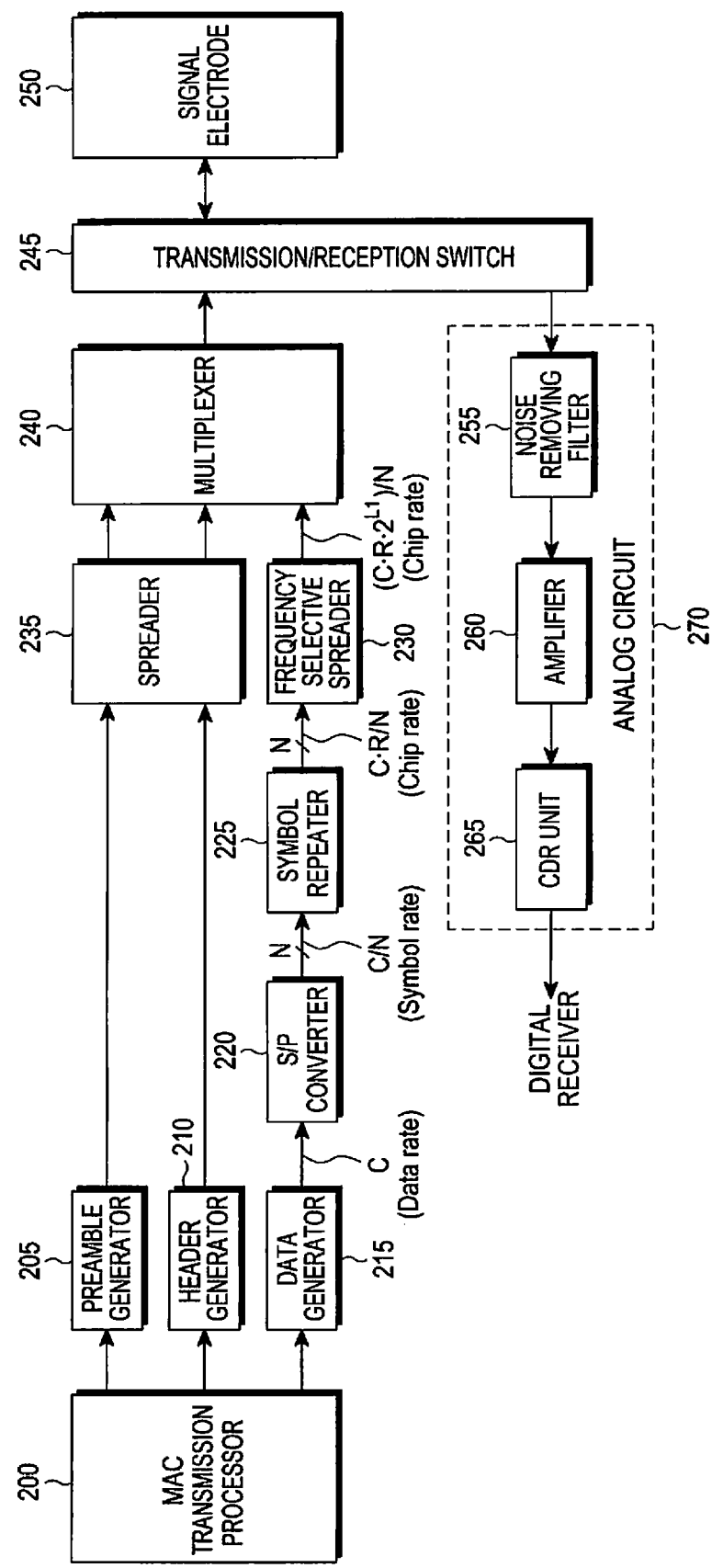
FIG. 3 is a block diagram illustrating a structure of a typical human body communication system.

Referring to FIG. 3, in the shown data transmission apparatus, a MAC transmission processor 200 first transfers information to a preamble generator 205, a header generator 210, and a data generator 215, so as to construct a packet to be transmitted. Outputs of the preamble generator 205 and the header generator 210 are spread by a spreader 235, are time-divisionally selected by a multiplexer 240, and are then transmitted through a signal electrode 250.

Data is transmitted after the header and is generated through the following process. First, when a data rate of data transmitted by the data generator 215 is C, the output of the data generator 215 is converted to symbols by an N:1 serial-to-parallel (S/P) converter 220. At this time, the symbol rate can be expressed by C/N. The output of the S/P converter 220 is repeated a predetermined number (R) of times by a symbol repeater 225 at the next stage. At this time, the symbol rate of the symbol repeater 225 can be expressed by C·R/N. The N bits of output of the symbol repeater 225 are transferred to a frequency selective spreader 230. The frequency selective spreader 230 is a kind of Orthogonal Modulator and is configured by $2^N$ sequences each having a length of $2^{L1}$. The frequency selective spreader 230 receives N bits of input and outputs a corresponding sequence at an output rate of $(C \cdot R \cdot 2^{L1})/N$. The outputs of the frequency selective spreader 230 are sequentially transferred after the transfer of a header by the multiplexer 240. Finally, the output of the multiplexer 240 is transmitted to the outside through a transmission/reception switch 245 and the signal electrode 250 without an analog circuit 270.

An incoming signal input through the signal electrode 250 passes through the transmission/reception switch 245 and then a noise removing filter 255, which removes frequency component of an undesired band. Then, the incoming signal passes through an amplifier 260, which amplifies the incoming signal to a desired analog signal. The output of the amplifier 260 is transferred to the next stage, i.e. a Clock recovery & Data Retiming (CDR) unit 265. That is, since data of a packet usually does not have separate information for synchronization of a receiver, a separate analog synchronization unit, such as the CDR unit 265, is necessary. At this time, since the data does not include additional synchronization information, the CDR unit 265 should extract the data simultaneously while performing the synchronization process. However, when the input level is very low, the CDR unit 265 may misoperate, which may cause performance degradation. Thereafter, the output of the CDR unit 265 is transferred to the next stage, i.e. a digital receiver.

Figure 4:
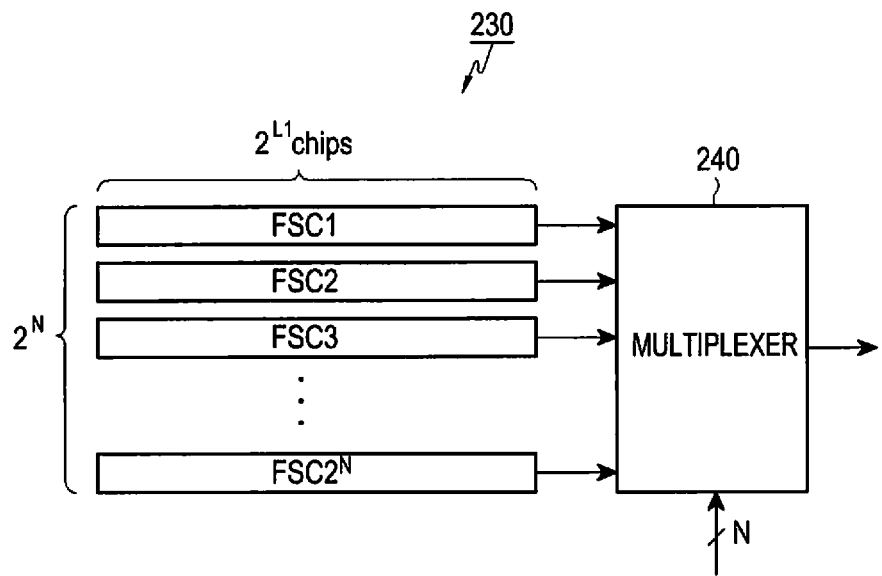
FIG. 4 is a block diagram illustrating a structure of a frequency selective spreader shown in FIG. 3.

Among the elements of the data transmission apparatus as described above, the frequency selective spreader 230 will be discussed hereinafter in more detail. FIG. 4 shows the structure of the frequency selective spreader. The frequency selective spreader 230 receives N inputs, selects one sequence from $2^N$ sequences each having a length of $2^{L1}$, and transfers the selected sequence to the next stage. The $2^N$ sequences used by the frequency selective spreader 230 correspond to sequences having energy distributed on relatively high bands, which are selected from $(2^{L1}, 2^{L1})$ Hadamard sequences. It is required that the sequences used by the frequency selective spreader be selected from only particular codes, i.e. Hadamard codes, in consideration of the band efficiency. Since the Hadamard codes have a bad correlation characteristic, it is necessary to apply sequences having a good correlation characteristic.

Figure 5:
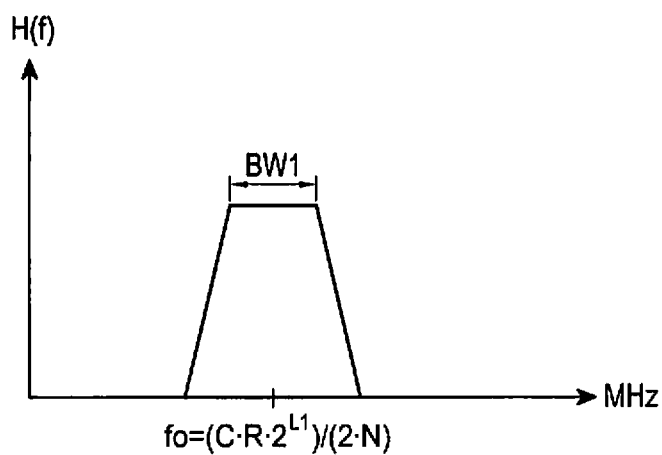
FIG. 5 is a graph showing the frequency band characteristics of the frequency selective spreader shown in FIG. 4.

The frequency band characteristic of the frequency selective spreader 230 is shown in FIG. 5. As shown in FIG. 5, transmission data can be spread over a desired band by the frequency selective spreader 230 of FIG. 4, wherein the central frequency of the desired transmission band is $(C \cdot R \cdot 2^{L1})/(2 \cdot N)$.

If the data rate C of data to be transmitted is 2 Mbps, N of the N:1 S/P converter is 4, and R of the symbol repeater is 1, a final output rate is 32 MHz when the sequence length of the frequency selective spreader is 64. At this time, the transmission central frequency is 16 MHz. Further, 16 sequences used by the frequency selective spreader are sequences having a relatively large energy distributed over 16 MHz, which are selected from (64, 64) Hadamard sequences. If the data rate C of data to be transmitted is 1 Mbps, N of the N:1 S/P converter is 4, and R of the symbol repeater is 1, the final output rate is 16 MHz when the sequence length of the frequency selective spreader is 64. However, at this time, the transmission central frequency goes down to 8 MHz. Since the influence of the human body noise increases according to the decent of the transmission frequency, R of the symbol repeater should be 2 in order to compensate for this problem. Then, although the central frequency is maintained as 16 MHz, even the 1 Mbps transmission has the same transmission bandwidth as that of the 2 Mbps transmission.

As described above, since the central frequency can be changed to a multiple of 2 or an inverse number of the multiple, there is a limitation in the movement of the central frequency by the interference signal. Further, when the central frequency increases to only a multiple of 2, the radiation characteristic may become too good, so that data transmission by the radiation may occur instead of data transmission through a human body. In the case of data transmission by the radiation, the power consumption of the system may become too large. Therefore, a method capable of moving the central frequency is necessary. Further, since it is required to maintain the same bandwidth in order to maintain the central frequency even at the time of low speed data transmission, the band efficiency may be degraded. Therefore, in consideration of this point, a method capable of maximizing the band efficiency while minimizing the transmission band is necessary.

Hereinafter, embodiments of the present invention will be described in more detail. The first embodiment of the present invention proposes a human body communication system, which enables selection of a central frequency and minimization of a transmission band, and especially proposes a data transmission apparatus of the human body communication system. The second embodiment of the present invention proposes a human body communication system, which can achieve a control of data speed, modulation, etc. as well as the minimization of a transmission band and the selection of a central frequency.

Figure 6:
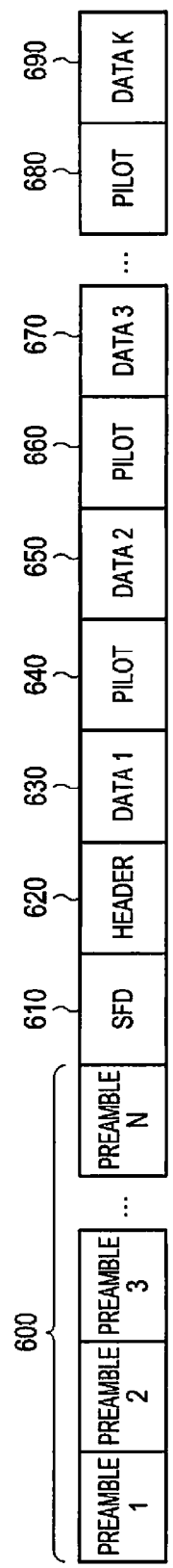
FIG. 6 illustrates a packet structure according to an embodiment of the present invention.

First, the human body communication system according to the first embodiment of the present invention generally includes a data transmission apparatus and a data reception apparatus, among which the data transmission apparatus will now be described with reference to FIG. 7. First, for more efficient transmission of data, the present invention proposes a packet structure as shown in FIG. 6. As shown in FIG. 6, the packet structure according to the present invention includes preambles 600, a Start Frame Delimiter (SFD) 610, a header 620, pilots 640, 660, . . . , 680, and data 630, 650, 670, . . . , 690. By inserting a synchronization code named a pilot between pieces of data, the CDR for clock restoration and data extraction at the receiver side becomes unnecessary. The start point of the SFD is detected through repetition of the preamble multiple times, and an SFD allocated a sequence different from the preamble is then transferred, so that the start point of the header is exactly detected. As a result, by only a simple 1 bit comparator and a digital circuit, it is possible to compensate for the time error, which may occur during the reception process.

Figure 7:
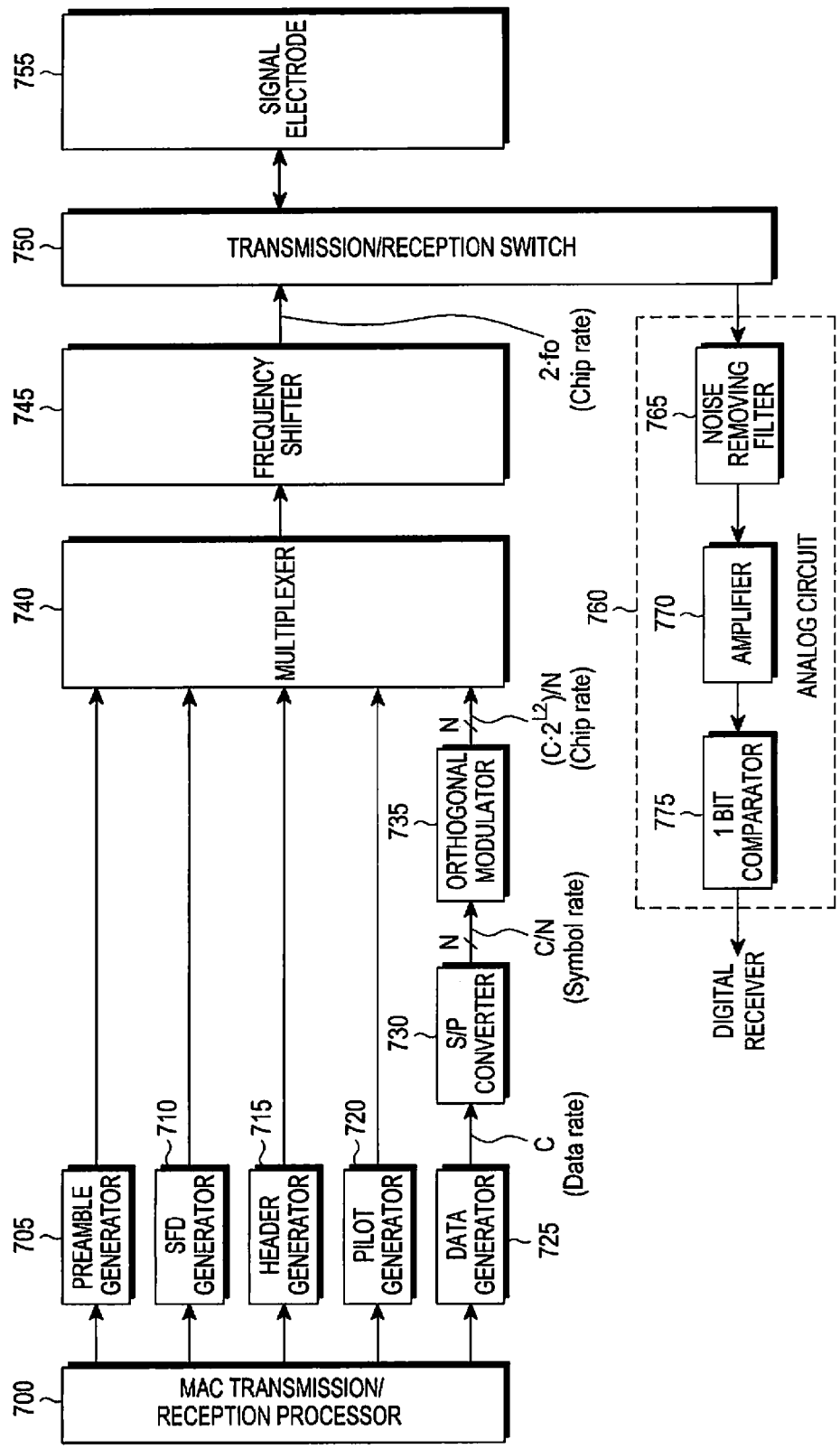
FIG. 7 is a block diagram illustrating a structure of a human body communication system according to a first embodiment of the present invention.

Referring to FIG. 7, a Media Access Control (MAC) transmission/reception processor 700 is a common element for both the data transmission apparatus and the data reception apparatus, and the MAC transmission/reception processor 700 operates as a transmission processor for transmitting data in a data transmission apparatus, which transmits data in a low frequency band. Since the selection of the central frequency according to the first embodiment of the present invention is an operation performed by a data transmission apparatus, elements of the data reception apparatus less closely related to the first embodiment of the present invention are omitted in FIG. 7.

The data transmission apparatus including the MAC transmission/reception processor 700 includes a preamble generator 705, a header generator 715, a data generator 725, a serial-to-parallel (S/P) converter 730, an orthogonal modulator 735, and a multiplexer 740. In order to construct the packet structure as shown in FIG. 6, the data transmission apparatus further includes an SFD generator 710 and a pilot generator 720. Especially, in the present invention, the data transmission apparatus further includes a frequency shifter 745 for shifting the output of the multiplexer 740 to a particular frequency.

The MAC transmission/reception processor 700 transfers information for packet configuration to each of the elements 705, 710, 715, 720, and 725. According to the transfer of the information, the preamble generator 705 generates a preamble signal, the SFD generator 710 generates an SFD for notifying the start point of header information, the header generator 715 generates packet header information, the pilot generator 720 generates pilots to enable synchronization at the time of receiving data, and the data generator 725 generates data. In the case of transmission of a packet including the preambles, SFDs, and pilots as shown in FIG. 6, the output rate of each sequence is adjusted to the orthogonal modulator 735, so as to make the transmission bands at the final output port coincide with each other. The data transmission apparatus repeatedly transmits the same preamble multiple times, transmits an SFD, transmits a header, and then transmits data, in which pilots are inserted with a predetermined period. By the insertion of the pilots, the receiver side can be implemented by only a 1 bit comparator and a digital circuit instead of the CDR.

Thereafter, the S/P converter 730 converts the data from the data generator 725 into symbols through serial-to-parallel conversion, and the orthogonal modulator 735 maps the symbols of the S/P converter 730 to one of sequences orthogonal to each other. At this time, the transmission is performed while the output rates of the preamble generator 705, the SFD generator 710, and the pilot generator 720 are maintained to be equal to the output rate of the orthogonal modulator 735, so as to maintain the transmission band of all packets to be the same.

Specifically, when the data rate of the data transferred from the data generator 725 is C, the data is converted to symbols having N bits by the N:1 S/P converter 730. The converted symbols are $2^N$ symbols and are transferred to the orthogonal modulator 735 having sequences having a length of $2^{L2}$. Then, the orthogonal modulator 735 maps one of the $2^N$ symbols according to N bits of information and then transfers the mapped symbol to the multiplexer 740. In this case, the output rate of the orthogonal modulator 735 is $(C \cdot 2^{L2})/N$. Since it is unnecessary to consider the frequency characteristic of the orthogonal modulator 735 used herein, it is possible to employ an orthogonal code having a correlation characteristic better than that of the Hadamard code, instead of the Hadamard code. Further, the newly employed orthogonal code instead of the Hadamard code can guarantee a stable performance at the receiver side.

Further, the multiplexer 740 time-divisionally selects signals output from the preamble generator 705, the SFD generator 710, the header generator 715, the pilot generator 720, and the orthogonal modulator 735. The output of the multiplexer 740 is shifted to a particular frequency by the frequency shifter 745 using a frequency shift sequence. Specifically, the output of the multiplexer 740 is transferred to the frequency shifter 745.

Figure 8:
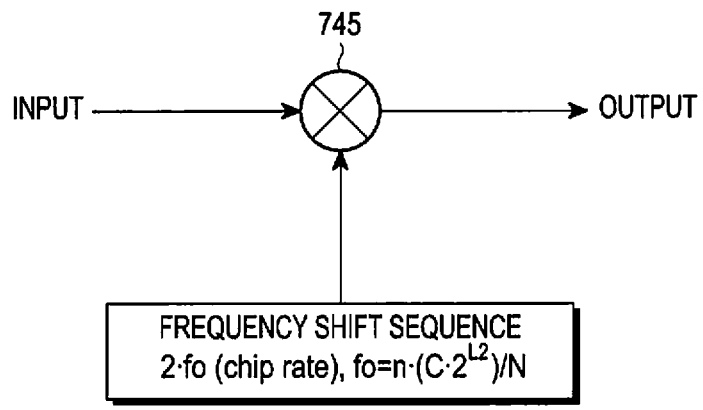
FIG. 8 illustrates a frequency shifter shown in FIG. 7.

At this time, when the frequency for transmission is $f_0$, the frequency shifter 745 multiplies the output of the multiplexer 740 by a frequency shift sequence having an output rate of $2 \cdot f_0$. Although a representative example of the frequency shift sequence is a sequence including alternately repeating 1s and 0s, the present invention is not limited thereto. The frequency-shifted signal is transmitted to the outside after passing through a transmission/reception switch 750 and a signal electrode 755. A structure of the frequency shifter as described above is shown in FIG. 8. As shown in FIG. 8, the central frequency by the frequency shifter may be set to a multiple of $(C \cdot 2^{L2})/N$, which is obtained by multiplying $(C \cdot 2^{L2})/N$ by a natural number. That is, the central frequency $f_0$ is $n \cdot (C \cdot 2^{L2})/N$. By this process, it is possible to achieve various central frequencies and simultaneously to obtain a processing gain one more time.

In order to transmit data by using a particular central frequency in a low frequency band as described above, data is subjected to a serial-to-parallel conversion by the S/P converter 730, is orthogonally modulated by the orthogonal modulator 735, and is then shifted from a baseband to a desired frequency band by the frequency shifter. At this time, a sequence including alternately repeating 0s and 1s is used as a frequency shift sequence.

Meanwhile, in the human body communication system, the data reception apparatus is an analog receiver and includes a noise removing filter 765, an amplifier 770, and a 1 bit comparator 775. The 1 bit comparator 775 is connected to the next stage, i.e. a digital receiver. The other elements of the data reception apparatus do not have a close relation to the first embodiment of the present invention, and thus a detailed description thereof is omitted here.

Figure 9:
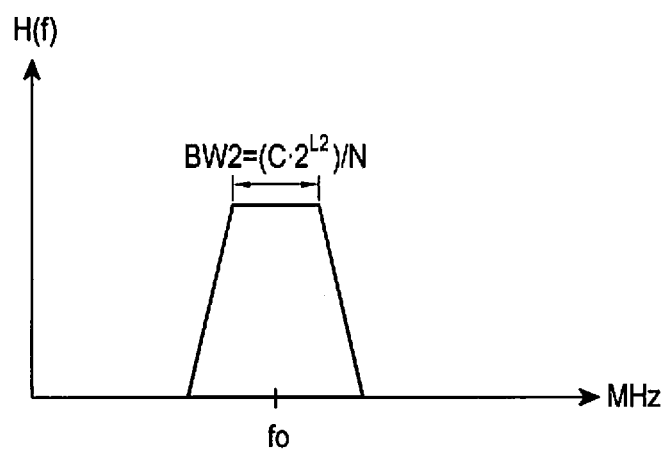
FIG. 9 is a graph showing the transmission frequency characteristics of the human body communication channels shown in FIG. 7.

The transmission frequency characteristics of a human body communication having the construction as described above are shown in FIG. 9. It is noted from FIG. 9 that the bandwidth of the transmission band is variable by the output rate $(C \cdot 2^{L2})/N$ of the orthogonal modulator, which provides a function capable of reducing the bandwidth by lowering the data rate C. That is, the bandwidth BW can be controlled by the data rate C, the length $2^{L2}$ of the orthogonal modulator, and N of the N:1 S/P converter.

When the data rate C of the system is 2 Mbps, and an S/P converter, N of which is 4, an orthogonal converter having 16 sequences, the length of which is 16, and a frequency shifter having a central frequency of 16 MHz and an output rate of 32 MHz are used, the output data has a band characteristic having a central frequency of 16 MHz and a bandwidth of 8 MHz. In contrast, in the case of 1 Mbps, the bandwidth is reduced to 4 MHz while the central frequency is maintained as 16 MHz. That is, differently from the construction shown in FIG. 2, a reduction of the data rate improves the band efficiency.

In the case of transmitting data at a data rate of 2 Mbps by 16 MHz carriers, if there is an interference component in this band, the 16 MHz should be shifted to a doubly higher frequency, i.e. 32 MHz, in the structure as shown in FIG. 2. In the structure according to the present invention as shown in FIG. 7, not only it is possible to shift the frequency to 32 MHz as in FIG. 2 by increasing the output rate of 8 MHz of the orthogonal modulator four times, but also it is possible to transmit data by 24 MHz carriers by increasing the output rate three times. As a result, it is possible to easily avoid an interference, to suppress the radiation characteristic of the transmitted data, and to minimize the increase of the power consumption.

Figure 10:
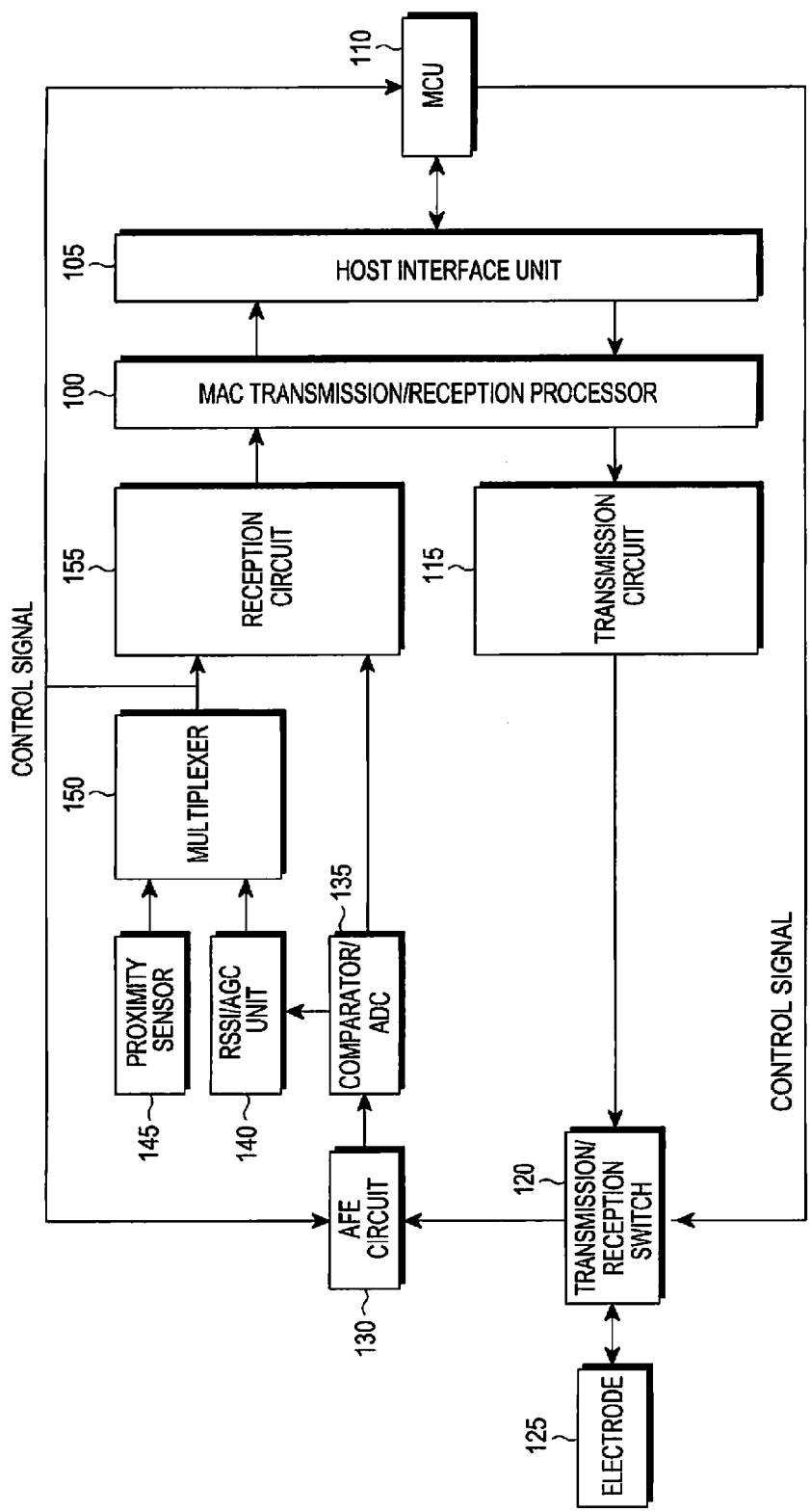
FIG. 10 is a block diagram illustrating a structure of a human body communication system according to a second embodiment of the present invention.

Hereinafter, a structure of a human body communication system capable of performing a non-contact data transmission using an electric field around a human body according to the second embodiment of the present invention will be described with reference to FIG. 10. FIG. 10 is a block diagram illustrating a structure of a human body communication system according to the second embodiment of the present invention. A stable operation of the human body communication system according to the second embodiment of the present invention in a non-contact state requires an idle control, a deep sleep control, and a security control, and the following description proposes a system design including a variety of information relating to such controls.

The human body communication system shown in FIG. 10 also includes a data transmission apparatus, a data reception apparatus, and common elements performing both transmission and reception. The common elements for transmission and reception include a MAC transmission/reception processor 100, a host interface unit 105 interconnecting a Micro Controller Unit (MCU) and a modem, and an MCU 110 for controlling modems and various signals.

The data transmission apparatus includes a transmission circuit 115 for transferring a communication signal generated by the MAC transmission/reception processor 100, a transmission/reception switch 120 for transferring an output of the transmission circuit 115 to the outside, and an electrode 125. The transmission/reception switch 120 is an element inevitably necessary in order to construct a human body communication system by one electrode, and controls a switch at the time of transmission and reception. This signal may be generated by modems of the transmitter or receiver, or may be generated by operation of software S/W.

Meanwhile, although specific elements of the transmission circuit 115 are not shown in FIG. 10, it goes without saying that they can be replaced by the elements from the preamble generator 705 to the frequency shifter 745 in FIG. 7. Accordingly, the transmission circuit 115 can transmit data generated according to the packet format defined in the MAC transmission/reception processor 100 at a particular frequency. In this case, the output from the transmission circuit 115 becomes the same as the output from the frequency shifter. Therefore, the frequency shifter included in the human body communication system according to the second embodiment of the present invention enables the selection of the central frequency and the minimization of the transmission band.

The data transmission apparatus includes an Analog Front End (AFE) circuit 130 amplifying a weak received electric field signal and removing noise from the signal, a comparator/Analog-to-Digital Converter (comparator/ADC) 135 for converting an analog signal to a digital signal, a Received Signal Strength Indication/Automatic Gain Control (RSSI/AGC) unit 140 for measuring the strength of an input signal and performing a control according to the measured strength, a proximity sensor 145 for outputting a proximity sensor value according to detection of a proximity of a human body, a multiplexer 150 for time-divisionally selecting and outputting signals from the proximity sensor 145 and the RSSI/AGC unit 140, and a reception circuit 155 for processing an incoming signal input through the comparator/ADC 135 and a signal output from the multiplexer 150. The signal from the AFE circuit 130 is converted to a digital signal through comparison of signal size, wherein either the comparator or the ADC may be selectively used for the conversion. When the conversion of the digital signal is performed by the ADC, the RSSI measurement also can be performed by the AGC unit. That is, an AGC unit functions also as an RSSI measurement unit capable of measuring the strength of a received signal, and performs AGC based on a result of the measurement. Although the RSSI measurement unit and the AGC unit are integrated in a single element for convenience of description in FIG. 10, it goes without saying that they can be separated from each other. Likewise, the ADC and the comparator can also be separated from each other.

The data transmission apparatus having the construction as described above is controlled using parameters, such as frequency, bandwidth, and sequential coding, in order to optimize the electric field communication, and the control may have a wide variety of forms according to the channel situation. In the data reception apparatus, a weak electric signal introduced through the electrode 125 is amplified to a certain degree by the AFE circuit 130, is filtered, and is then transferred to the comparator/ADC 135. At this time, the comparator compares the magnitude of the introduced signal, and the ADC 135 converts the signal into a digital signal according to the compared magnitude, so as to enable measurement of the RSSI. The magnitude of the input signal is measured with a close correlation according to the channel state, i.e. according to whether the ground coupling is good or bad.

Here, the ADC 135 can measure the RSSI of an incoming signal at any position within the AFE circuit 130, and can generate an input signal for AGC based on the measured RSSI. The reason why the ADC 135 measures the RSSI at any position within the AFE circuit 130 is that, in a good ground coupling situation, i.e. in a good channel environment, the signal may be saturated too early at the stage after the amplifier or after the filter. The measured RSSI indicates the strength of the received signal, which corresponds to an important parameter notifying the channel state of a non-contact electric field communication. That is, if the ground coupling state has been improved by a closely located human body or another factor, the RSSI value increases. It is possible to grant a channel priority to a plurality of devices by using this property, and possible to use this property for various purposes, such as measurement of a distance from a human body.

The measured RSSI is used for gain control of the AFE circuit 130 for itself. Further, the measured RSSI is used as a basis for selection of a sequential code, data rate, a spreading factor, a filter bandwidth and gain, a frequency, etc. in the data reception apparatus. In view of users, the determination of whether the electrode is in contact or in non-contact should be based on a use scenario of technology, and the best channel state is used to identify a good user in the case of multi-users. Further, since the RSSI value shows a change according to specific human motions, it is possible to provide various input control signals relating to human motions by providing this control value to the MCU 110. That is, the MCU 110 determines, by using the RSSI value or a proximity sensor value, whether the electrode 125 is in a non-contact state, and outputs a control signal based on a result of the determination. Further, the RSSI value can be configured to some degree by the control of the proximity sensor 145, and it is possible to transfer a control signal to the reception circuit 155, the MCU 110, and the AFE circuit 130 since it is possible to collect information about only the state of a human body.

Moreover, in a non-contact human body communication system using an electric field around a human body, the general system control is performed by the MCU 110 for control of the entire system, which is mostly in a standby state. In general, in order to implement a system as described above, a design of a slotted frame structure is required and an idle timing is controlled based the slotted frame structure. Even in the case of shifting from the standby state to a wakeup state, the input can be controlled by the proximity sensor 145 and an input signal from the RSSI measurement unit 140 as described above.

As described above, the second embodiment of the present invention provides a system, which enables communication by a user even in a non-contact state by using an electric field around a human body and can transmit data in a low frequency band. A human body communication according to second embodiment of the present invention can control selection of a central frequency, minimization of a transmission band, the central frequency, a data rate, modulation, etc.

The invention claimed is:

1. An apparatus for transmitting data in a low frequency band in a human body communication system, the apparatus comprising:
   a preamble generator for generating a preamble signal;
   a header generator for generating packet header information;
   a data generator for generating data;
   a serial-to-parallel converter for converting the data transferred from the data generator to symbols through a serial-to-parallel conversion;
   an orthogonal modulator for mapping the symbols transferred from the serial-to-parallel converter to one of sequences orthogonal to each other;
   a multiplexer for time-divisionally selecting signals output from the preamble generator, the header generator, and the orthogonal modulator; and
   a frequency shifter for shifting an output of the multiplexer to a particular frequency.

2. The apparatus of claim 1, further comprising:
   a Start Frame Delimiter (SFD) generator for generating an SFD notifying a start point of header information in a transmitted packet including preambles, the SFD, a header, and data; and
   a pilot generator for generating a pilot, which enables a synchronization process when data is received.

3. The apparatus of claim 2, wherein an output rate of each of the sequences is adjusted to the orthogonal modulator, so as to make transmission bands at a final output port coincide with each other, when a packet including the preambles, the SFD, the header, pilots, and the data is transmitted.

4. The apparatus of claim 2, wherein the preamble from the preamble generator is repeated one or more times and is then transmitted, the SFD from the SFD generator is transmitted, a header generated by the header generator is transmitted, and the data generated by the data generator is then transmitted with pilots inserted in the data at a predetermined period, the pilots being generated by the pilot generator.

5. The apparatus of claim 1, wherein the frequency shifter shifts the output of the multiplexer to a particular frequency by using a frequency shift sequence.

6. The apparatus of claim 5, wherein the frequency shift sequence used by the frequency shifter is a sequence including alternately repeating 0s and 1s.

7. The apparatus of claim 1, wherein a transmission bandwidth of the apparatus is variably controlled by a data rate C, a length $2^{L2}$ of the orthogonal modulator, and N of the serial-to-parallel converter, which is an N:1 serial-to-parallel converter.

8. The apparatus of claim 1, wherein the frequency shifter sets a central frequency to a multiple of an output rate $(C \cdot 2^{L2})/N$, which is obtained by multiplying the output rate $(C \cdot 2^{L2})/N$ by a natural number.

9. A human body communication system for performing a non-contact communication using an electric field around a human body, the human body communication system comprising:
   a transmission circuit for transmitting data, which is generated according to a packet format defined by a MAC transmission/reception processor, using a particular frequency;
   an electrode for outputting an output from the transmission circuit to an outside;
   an Analog Front End (AFE) circuit for receiving a signal from the electrode, amplifying the signal and removing noise from the signal;
   a received signal strength measurement unit for measuring a strength of a received signal;
   a proximity sensor for outputting a proximity sensor value according to detection of a proximity of a human body;
   a multiplexer for selectively outputting signals from the proximity sensor and the received signal strength measurement unit;
   a reception circuit for processing signals from the multiplexer and an analog-to-digital converter; and
   a Micro Controller Unit (MCU) for determining, by using the RSSI value or a proximity sensor value, whether the electrode is in a non-contact state, and outputting a control signal based on a result of the determination.

10. The human body communication system of claim 9, wherein the measured strength of the received signal is used as a basis for selection of at least one of a sequential code, a data rate, a spreading factor, a gain, a filter bandwidth, a frequency selection, and a gain control of the Analog Front End (AFE) circuit.

11. The human body communication system of claim 9, further comprising:
   a host interface unit interconnecting the Micro Controller Unit (MCU) and the modem; and
   a MAC transmission/reception processor defining a packet format for transmission and reception of data.

12. The human body communication system of claim 9, wherein the transmission circuit comprises:
   a preamble generator for generating a preamble signal;
   a header generator for generating packet header information;
   a data generator for generating data;
   a serial-to-parallel converter for converting the data transferred from the data generator to symbols through a serial-to-parallel conversion;
   an orthogonal modulator for mapping the symbols transferred from the serial-to-parallel converter to one of sequences orthogonal to each other;
   a multiplexer for time-divisionally selecting signals output from the preamble generator, the header generator, and the orthogonal modulator; and
   a frequency shifter for shifting an output of the multiplexer to a particular frequency.

13. The human body communication system of claim 9, further comprising:
   a comparator for comparing a magnitude of a signal from the Analog Front End (AFE) circuit and converting the signal to a digital signal according to the magnitude of the signal,
   wherein the received signal strength measurement unit measures a strength of a signal from the comparator.

14. The human body communication system of claim 9, further comprising:
   an analog-to-digital converter for converting a signal from the Analog Front End (AFE) circuit to a digital signal according to a magnitude of the signal from the Analog Front End (AFE) circuit,
   wherein the received signal strength measurement unit measures a strength of a signal from the analog-to-digital converter.

15. The human body communication system of claim 14, wherein the received signal strength measurement unit measures the strength of the signal from the analog-to-digital converter and performs an automatic gain control based on the measured strength.

16. A method of transmitting data in a low frequency band in a human body communication system, the method comprising:

generating preamble signals, packet header information, and data;

converting the generated data to symbols through a serial-to-parallel conversion;

mapping the symbols to one of sequences orthogonal to each other;

time-divisionally selecting the preamble signals, the packet header information, and the mapped symbols; and shifting the selected signals, information, and symbols to a particular frequency.

17. The method of claim 16, wherein shifting of the selected signals, information, and symbols to the particular frequency uses a frequency shift sequence.

18. The method of claim 16, further comprising:

generating a Start Frame Delimiter (SFD) notifying a start point of header information in a transmitted packet including preambles, the SFD, a header, and data; and generating a pilot, which enables a synchronization process when data is received.

19. The method of claim 16, wherein, in shifting of the selected signals, information, and symbols to the particular frequency, a central frequency is set to a multiple of an output rate $(C \cdot 2^{L2})/N$ of the orthogonal modulator, which is obtained by multiplying the output rate $(C \cdot 2^{L2})/N$ of the orthogonal modulator by a natural number.

* * * * *